(No Model.)

J. A. O'LEARY.
DIPPER HANDLE MACHINE.

No. 412,289.  Patented Oct. 8, 1889.

Witnesses:
Walter S. Wood
S. R. Burke

Inventor
John A. O'Leary
By Lucius C. West
Atty

UNITED STATES PATENT OFFICE.

JOHN A. O'LEARY, OF DECATUR, MICHIGAN.

DIPPER-HANDLE MACHINE.

SPECIFICATION forming part of Letters Patent No. 412,289, dated October 8, 1889.

Application filed May 23, 1889. Serial No. 311,787. (No model.)

*To all whom it may concern:*

Be it known that I, JOHN A. O'LEARY, a citizen of the United States, residing at Decatur, county of Van Buren, State of Michigan, have invented a new and useful Dipper-Handle Machine, of which the following is a specification.

This invention has for its object the following described and claimed machine for forming dipper-handles.

Figure 1:
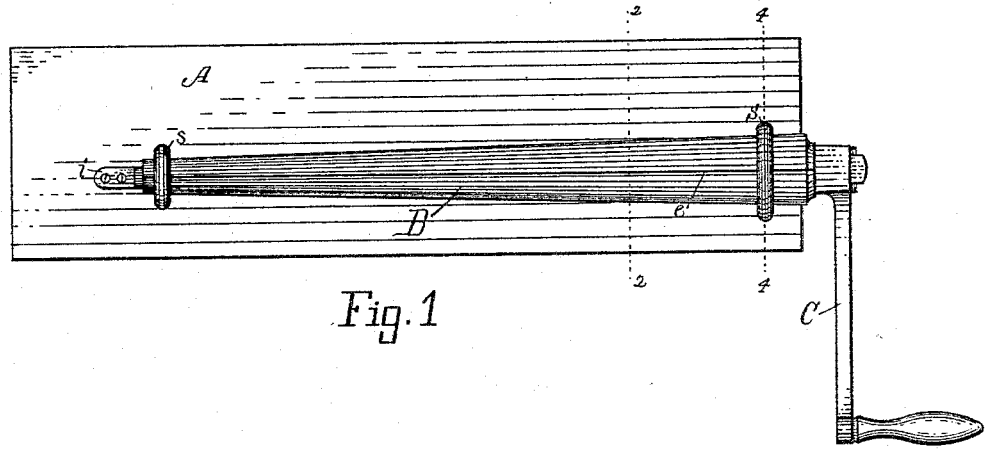
Figure 2:
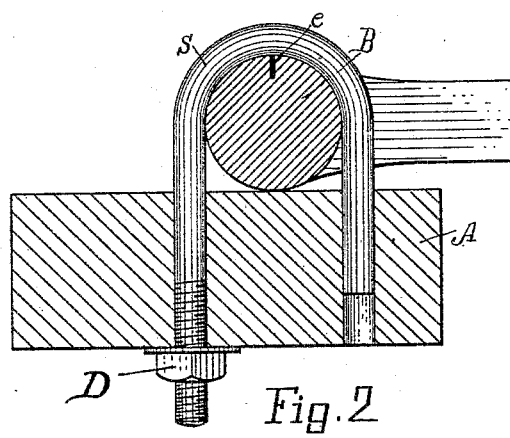
Figure 3:
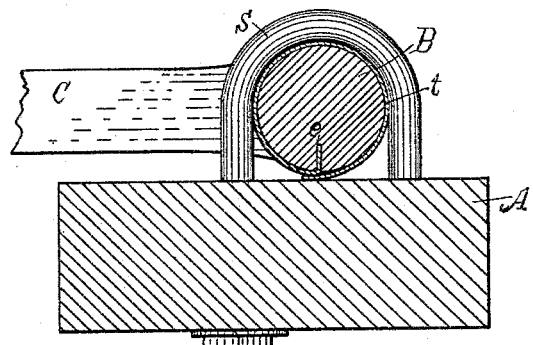

In the drawings forming a part of this specification, Figure 1 is a plan view; Fig. 2, a section on line 4 4 in Fig. 1; and Fig. 3 is a section on line 2 2 in Fig. 1, showing the operation of forming the handle.

Referring to the lettered parts of the drawings, A is the block to which the bearings S of the shaft B are attached. The shaft B is tapered like the shape of a dipper-handle, and is provided with a channel $e$, into which one edge of the tin from which the handle is made is inserted. The handle is then formed into a roll by turning the crank C and revolving the shaft in a direction to roll the tin between the shaft B and block A and around the shaft, as at $t$ in Fig. 3. The handle is detached by moving the shaft to the right and detaching the small end from its loop or bearing, and then pulling the handle off the small end. The edge of the tin which was in the channel $e$ is left projecting inwardly toward the center of the handle, as seen in Fig. 3, and this makes the handle stiffer.

It is preferred that the loops S shall be adjustable, so as to be quickly adapted to different-sized shafts. The loops are in the form of a staple, with one end extended through the block A, and threaded and provided with a nut D, Fig. 2. By screwing the nuts farther on or off, the loops can be raised or lowered. The shaft may be mounted on a table or bench, and the block A may serve to illustrate this.

At $i$ in Fig. 1 is a stop to limit the distance the shaft B can be inserted in the loops, so as to prevent being wedged therein.

Having thus described my invention, what I claim, and desire to secure by Letters Patent of the United States, is—

A dipper-handle-forming machine comprising a suitable base, the adjustable bearing-loops extended through the base and provided with adjusting-nuts, the tapered and longitudinally-channeled shaft detachably confined by said bearing-loops, and a stop at the end of said shaft, substantially as set forth.

In testimony of the foregoing I have hereunto subscribed my name in presence of two witnesses.

JOHN A. O'LEARY.

Witnesses:
 GIDEON B. BROWNING,
 EMORY H. SQUIER.